Feb. 9, 1965 M. S. BRODRICK 3,168,888
METHOD OF FEEDING DAIRY COWS
Filed July 17, 1962 3 Sheets-Sheet 1
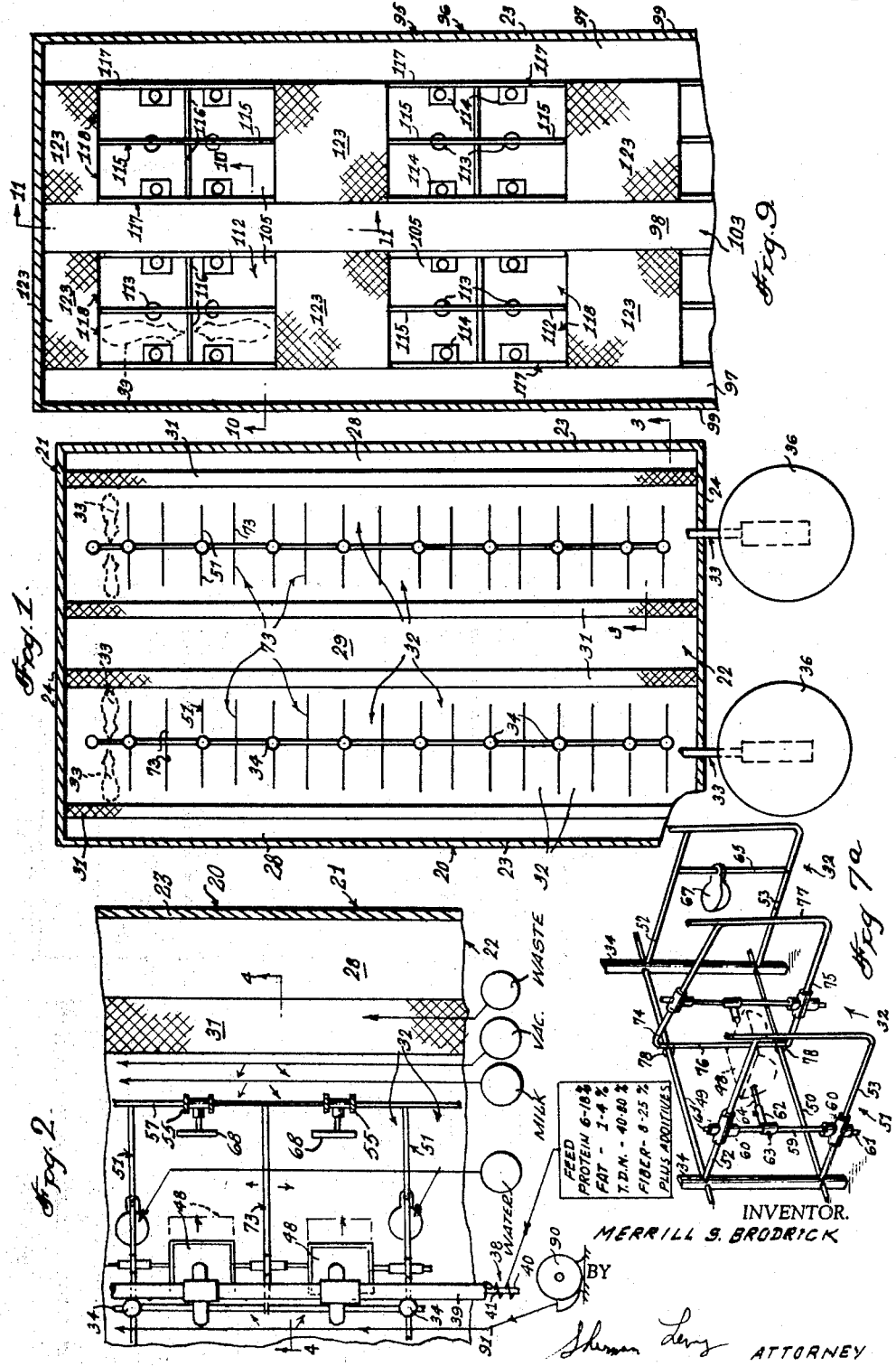
INVENTOR.
MERRILL S. BRODRICK
BY
Sherman Levy
ATTORNEY

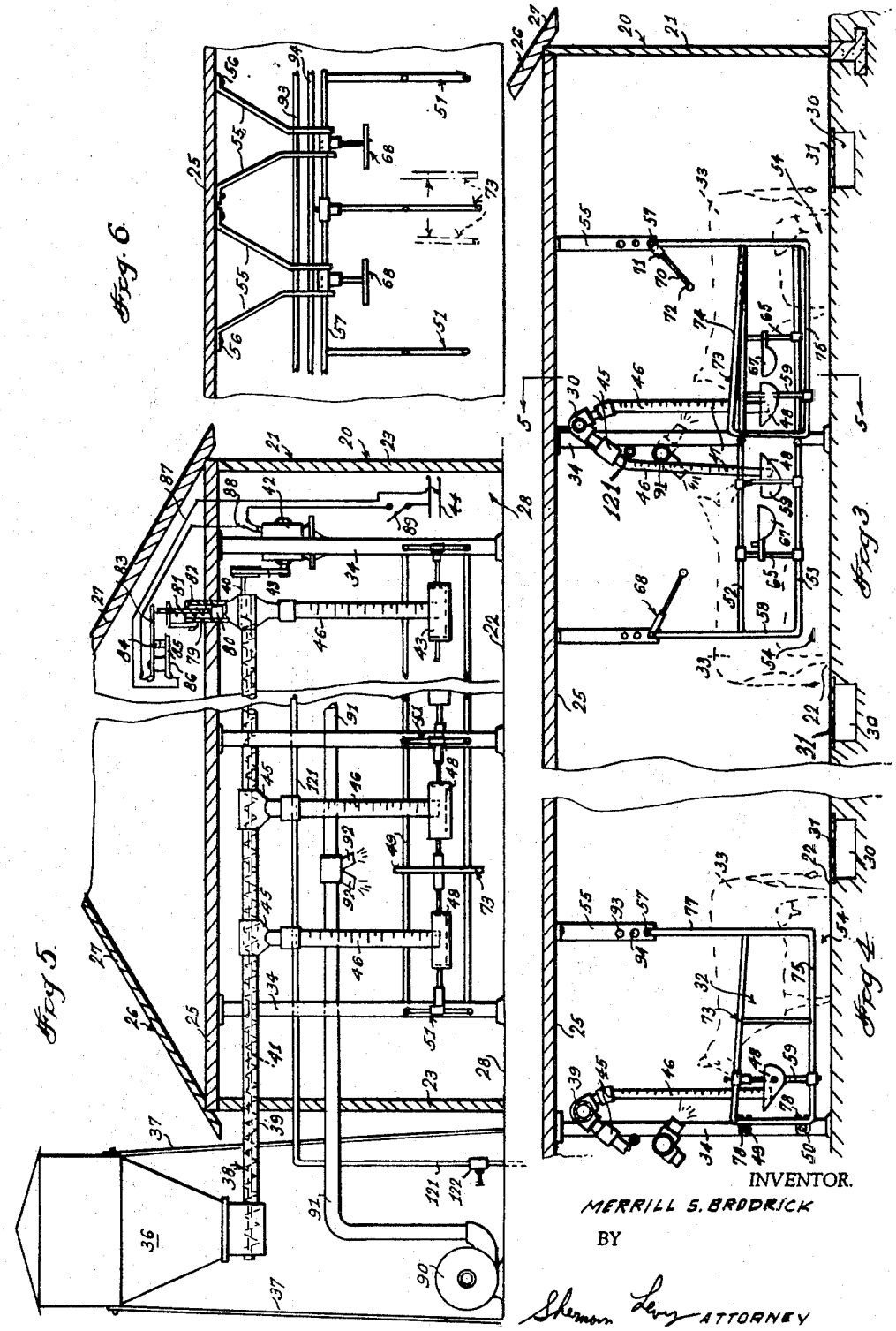

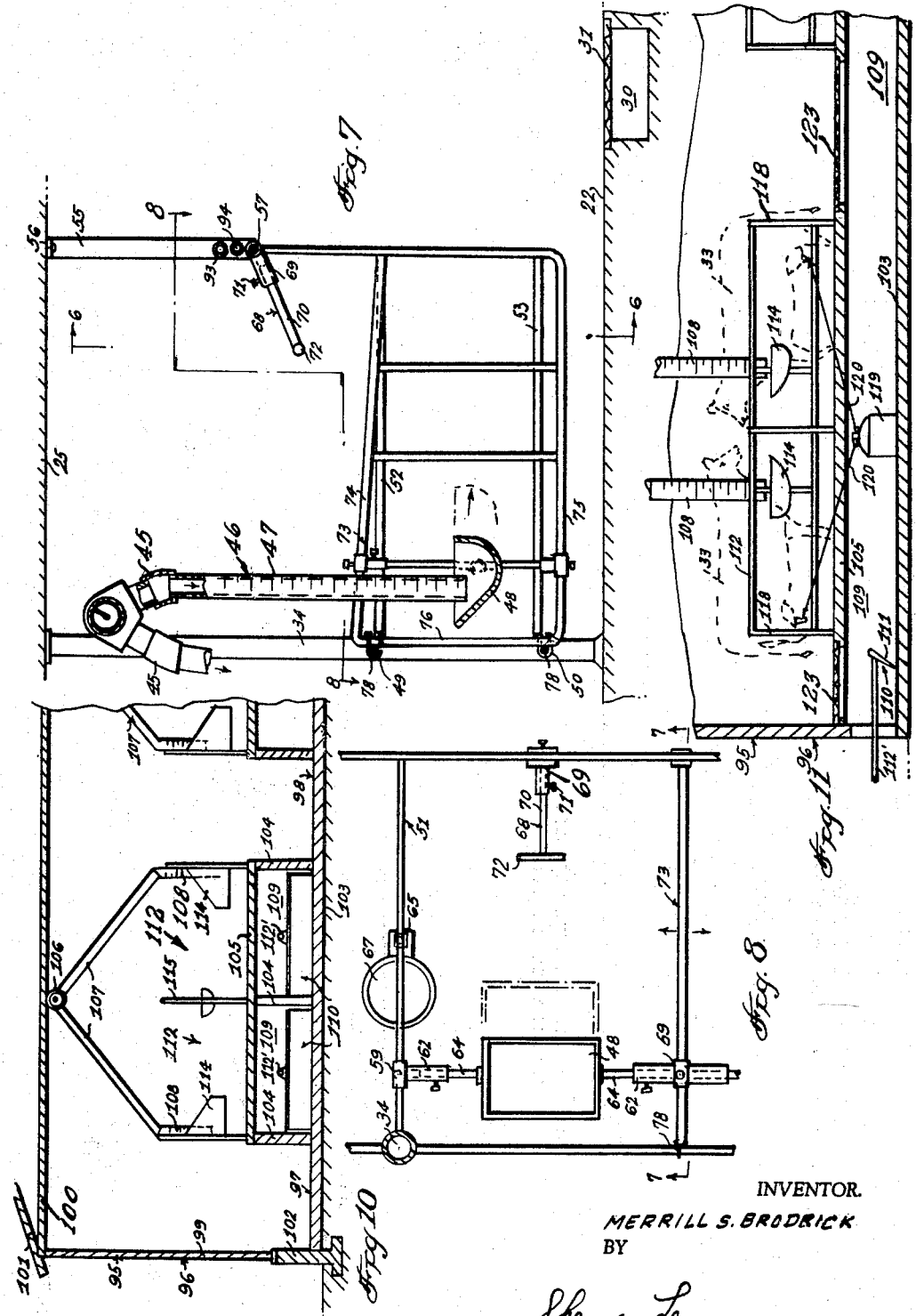

United States Patent Office 3,168,888
Patented Feb. 9, 1965

3,168,888
METHOD OF FEEDING DAIRY COWS
Merrill S. Brodrick, 58 College Ave., Mansfield, Pa.
Filed July 17, 1962, Ser. No. 210,449
2 Claims. (Cl. 119—51)

This invention relates to the production of milk from cows, and more particularly to a highly efficient milk producing or processing and marketing center or any combination thereof.

The primary object of this invention is to provide a milk production center wherein the plurality of cows are adapted to be arranged in such a manner so that maximum production of milk is insured with minimum cost and with a minimum amount of labor required, and wherein according to the present invention a self feeding system is used for furnishing the various nutrients, crude protein, carbohydrates and fat in such proportions and amount as will properly nourish a given animal or cow.

A further object is to provide a milk producing center wherein unlimited self feeding of dairy cows is provided for, and wherein integrated feeding is utilized wherein one feed is moved by means of relatively simple equipment so that the cows can be fed by an unlimited self feeding system.

A still further object of the present invention is to provide a feeding system and milk production center, wherein the feeding system utilizes one balanced ration or blended feed, and wherein there is provided a means for moving the feed to the cow, and a means for insuring free access feeding of the cows, and wherein there is also provided a means for measuring the consumption of feed per cow for the past 24-hour period, the present invention also utilizing self feeding stalls with longitudinal and lateral adjustments, and wherein the stalls are characterized by the absence of floor connections so that cleaning thereof can be facilitated.

A further object of the present invention is to provide a milk production and marketing system which is based on a new and strictly non-conventional feeding program, namely self feeding of one and only one specifically blended feed, and wherein the feed is kept in front of the entire herd of dairy cows so as to allow each cow to eat on an at will basis 24 hours a day so that a number of other important advantages are achieved such as improved physical condition of the herd, high breeding efficiency, and increased milk production over previous prime conventional methods of feeding dairy cows.

A further object of the present invention is to provide a milk production and marketing system which is adapted to result in higher profits in mechanized volume production and retail sale of quality controlled milk, and wherein full automation as well as top labor efficiency with automatic cow feeding means for increased production of a more uniform all year round quality controlled milk is insured, and wherein with the present invention the cow is always filled with solid nutrition.

Still another object of the present invention is to provide a milk production and marketing system whereby there is provided a means for establishing a location which provides both a top retail and/or wholesale milk market, and wherein cows are full fed and handled to give more milk at less cost, and wherein the present invention is adapted to provide a greater marginal net return to the operator, and wherein with the present invention there is provided means for providing integrated milk production, processing, and sales systems within populated areas, for retail sales of milk, and wherein there is provided means whereby a milk producer can transfer his cows out of a wholesale market into a retail milk market, the present invention also providing environmental control to cut 20 degrees off both the cold and heat extremes in temperatures, boosting milk production and feed efficiency, the present invention including a novel process of making and blending a feed which is free flowing and which can be fed to dairy cows in a self feeder arrangement in stalls and the like.

Another object is to provide a milk production and marketing system wherein butter fat content of the milk is controlled through manipulation of the amount and coarseness of ground forage or rolled crushed grain fiber of a length in critical areas, and wherein the present invention also contemplates the pasteurization, cooling, and holding of milk in one repectacle, with means for elevating the holding tank to a conventional height for the operator to draw off milk, the present invention providing a milk production, processing, sales system which is integrated and fully automated and which is in the nature of closed systems for use in populated area operations, and wherein the present invention contemplates the tilting of barns or buildings as well as gravity drainage, milk pipe lines, gutters, and the like.

Still another object of the present invention is to provide a feeding system wherein one feed is utilized which is adapted to consist of 6 to 18% crude protein, 1 to 4% fat, 40 to 80% T.D.N., 8 to 25% fiber, plus additives, and wherein the feed is highly palatable so that the animal will eat the same by self feeding in adequate amounts but without over indulgence, and wherein the biological needs of the animals are satisfied to the optimum extent and wherein the lactation production processes will be maximized, the present invention residing both in the process of making the feed and the self feeding means of offering the feed to the animals so that the quantity to be eaten is based on the needs of the animal and is governed by the volume consistency of the feed, the feed being free flowing and serving to provide essential nutrients, the feed having a uniform composition so that each bite of feed will be the same, and wherein controlled uniform milk quality and butter fat content is insured due to improved nutrition, sanitation, flavor, and milk solids content.

Still another object is to provide such a milk production center that is economical to manufacture and operate and efficient in operation and which is rugged in structure and foolproof in use.

These and other objects of the invention will become apparent from a reading of the following specification and claims, together with the accompanying drawing, wherein like parts are referred to and indicated by like reference characters and wherein:

FIG. 1 is a diagrammatic plan view illustrating one form of the dairy establishment of the present invention.

FIG. 2 is an enlarged plan view, with parts broken away, illustrating several of the individual stalls.

FIG. 3 is an enlarged sectional view taken on the line 3—3 of FIG. 1.

FIG. 4 is a sectional view taken on the line 4—4 of FIG. 2.

FIG. 5 is an enlarged sectional view taken on the line 5—5 of FIG. 3.

FIG. 6 is a fragmentary elevational view taken on the line 6—6 of FIG. 7.

FIG. 7 is a sectional view taken on the line 7—7 of FIG. 8.

FIG. 7a is a fragmentary perspective view illustrating certain constructional details of the present invention.

FIG. 8 is a sectional view taken on the line 8—8 of FIG. 7.

FIG. 9 is a fragmentary plan view illustrating a modification.

FIG. 10 is an enlarged sectional view taken on the line 10—10 of FIG. 9.

FIG. 11 is an enlarged sectional view taken on the line 11—11 of FIG. 9.

Referring in detail to the drawings, and more particularly to FIGS. 1 through 8 of the drawings, the numeral 20 indicates the dairy establishment of the present invention which is shown to comprise a cow barn 21, FIG. 5, and the numeral 22 indicates a horizontally disposed floor, while the numerals 23 and 24 indicate wall members such as the side walls of the barn 21, and the numeral 24 indicates end wall members, FIG. 1. There is further provided a horizontally disposed ceiling 25, and a roof such as the roof 26 may be provided, and wherein the roof 26 may include inclined portions 27. As shown in FIG. 1 there is provided or defined on the floor 22 a pair of spaced parallel outer work aisles 28, and there is also provided an intermediate work aisle 29. The numeral 30 indicates gutters which are contiguous to the work aisles, and horizontally disposed grills or gratings 31 are arranged over the gutters 30, and the gutters 30 are adapted to receive waste material from cows such as the cows 33 which are arranged in the stalls 32. As shown in the drawings the stalls 32 are arranged so that the cows are adapted to be positioned in aligned rows, and wherein the cows in one row are arranged in head to head relation with respect to the cows in another row, for a purpose to be later described.

Arranged in the barn 21 is a plurality of spaced parallel vertically disposed posts 34, FIG. 5.

There is further provided a feed supply means which includes one or more feed tanks 36 which are adapted to be arranged in a suitable location such as exteriorly of the barn 21, and the tanks 36 may be suitably supported as at 37. The numeral 38 indicates an auger which comprises an elongated conduit 39 that is adapted to be connected to the lower end of the tank 36, and a shaft 40 extends through the conduit 39, and the shaft 40 is adapted to have a spiral blade or element thereon, as indicated by the numeral 41. As shown in the drawings, a motor such as an electric motor 42 is adapted to drive the shaft 40 as, for example, by means of a belt or chain and sprocket drive 43. The motor 42 is adapted to be connected to a suitable source of electrical energy as, for example, by means of wires or conductors 44.

Connected to the conduit 39 at spaced apart points therealong are fittings 45, and the numeral 46 indicates transparent calibrated tubes 46 which have their upper ends connected to and depending from the fittings 45, and as shown in FIG. 7, there is provided a plurality of graduations or calibrations 47 on the transparent tubes 46. The lower ends of the tubes 46 are open, and arranged below the lower ends of the tubes 46 are mangers or feed boxes 48 for receiving feed from the tubes 46.

As shown in the drawings the stalls 32 are defined by horizontally disposed spaced parallel upper and lower rods or pipes 49 and 50 which extend between the posts 34 and which are secured thereto as by welding, and the numeral 51 indicates spaced parallel vertically disposed side sections which include upper and lower bars 52 and 53 that are fixed to the posts 34, and the bars 52 and 53 are arranged at right angles with respect to the rods 49 and 50, FIG. 7a. The numeral 54 indicates spaces below the side sections 51 and such spaces serve to insure that cleaning of the stalls and surrounding areas will be facilitated since there will be a minimum amount of obstructions to collect foreign matter or the like. The numeral 55 indicates braces which depend from the ceiling 25 and which are secured thereto as at 56, FIG. 6, and horizontally disposed support elements 57 are suitably affixed to the braces 55. The side sections 51 include end members 58 which are vertically disposed, and the upper ends of the end members 58 are adapted to be secured as by welding to the support elements 57. The numeral 59 indicates vertically disposed cross pieces which are adjustably connected to the bars 52 and 53 as by means of brackets 60 which have set screws or screw members 61 associated therewith, and brackets 62 are adjustably connected to the cross pieces 59, and set screws 63 are provided for retaining or maintaining the brackets 62 stationary or immobile in their adjusted positions on the cross pieces 59. The feed boxes 48 have shanks or stems 64 which are adapted to be adjustably connected to the brackets 62.

The numeral 65 indicates vertically disposed spaced apart cross elements which are adjustably connected to the bars 52 and 53 as at 66, and water bowls or containers 67 are operatively connected to the elements 65.

As shown in the drawings, there is further provided trainers which are indicated generally by the numeral 68, FIG. 3, and the trainers 68 are arranged rearwardly of the cows 33, and the trainers 68 include support pieces 69 which are suitably affixed to the elements 57 as by welding or by any other suitable means, and an arm 70 is adapted to be adjustably or telescopically connected to the support pieces 69 and wherein there is provided a securing element or set screw 71 for maintaining the arm 70 stationary in its adjusted positions, there being a transverse member or lug 72 affixed to and carried by the projecting end of the arm 70. These trainers 68 are used to help keep the cows in proper alignment with the gutter area and help stop arching of the back of the cows at the time of defecation.

The numeral 73 indicates an adjustable frame unit which is adjustably mounted between adjacent pairs of side sections 51, FIG. 7a, and due to the provision of the adjustable frame unit 73, the size of the stalls can be varied as, for example, in order to accommodate cows or animals of different sizes or shapes. The frame unit 73 includes spaced apart upper and lower elements 74 and 75 which have spaced parallel first and second vertically disposed end elements 76 and 77 suitably affixed thereto, and the end element 76 is adapted to be adjustably connected to the rods 49 and 50 as, for example, by means of U-bolts 78 which may have suitable nuts thereon.

As shown in FIG. 5, one of the tubes 46 is adapted to have an extension 79 on the upper end thereof, and the numeral 80 indicates a plunger which is movably mounted in the extension 79, and an upstanding stem 81 is suitably secured to the plunger 80, and a coil spring 82 is circumposed on the stem 81. The upper end of the stem 81 is adapted to abut or engage a movable spring arm 83 which carries a movable contact 84, and the contact 84 is mounted for movement into and out of electrical engagement with a stationary contact 85 which is supported as at 86. The numerals 87 and 88 indicate wires or conductors which serve to electrically connect the parts including a switch 89 into the electrical circuit. When the switch 89 is manually actuated and turned on, the motor 42 is energized and this causes rotation of the auger shaft 40 by means of the belt 43, and as the shaft 40 is turned, it actuates the spiral member 41 to move feed in from the tank 36 so as to fill each of the calibrated tubes 46. When all of the tubes 46 are filled with feed, pressure will build up against the plunger 80 to raise the shaft 81 upwardly and compress the coil spring 82 and the shaft or member 81 will engage the spring arm 83 and thereby separate the contact points 84 and 85 so that the electrical circuit of the motor 42 is broken, and then the switch 89 is manually reopened thereby stopping all feed in movement to the individual calibrated feed tubes 46. By means of the calibrated tubes 46, a person can read or ascertain the individual animal's feed consumption. The parts including the contacts 84 and 85 function as a safety switch to prevent overloading and damage to the equipment or system.

As shown in the drawings, an air blower 90 is adapted to be arranged exteriorly of the barn 21, and the blower 90 is adapted to supply air through ducts 91 to the interior of the barn, and such air may be discharged through suitable outlets 92, whereby the barn will be properly ventilated and wherein the animals will receive sufficient oxygen or air for maximum comfort and efficiency.

The numerals 93 and 94 indicate milk and vacuum lines which are arranged in the barn.

Attention is now directed to FIGS. 9, 10 and 11 of the drawings wherein there is illustrated a modification, and in FIGS. 9, 10 and 11 the milk producing center is indicated generally by the numeral 95 and is shown to comprise a barn-like structure 96 which is provided with longitudinally extending spaced parallel outer work areas or aisles 97 as well as an intermediate work aisle 98, FIG. 9. The barn 96 may also be provided with upstanding walls 99 as well as a ceiling 100 and a roof 101, FIG. 10. The barn may include foundations 102, and the numeral 103 indicates a horizontally disposed floor. Upstanding support members 104 are arranged on the floor 103, and horizontally disposed raised platforms 105 are supported by the members 104. The work aisles 97 and 98 are arranged adjacent the sides of the platforms 105. The numeral 106 indicates a feed supply auger which may be suitably connected to a feed tank such as the tank 36, and branch lines or conduits 107 depend from the auger 106, and the numeral 108 indicates calibrated transparent tubes 108 which are connected to the lower end portions of lines or conduits 107, and the calibrated transparent tubes 108 may have a construction which is generally similar to the previously described tubes 46.

The numeral 123 indicates horizontally disposed grills or gratings which are coplanar with the raised platforms 105, and below the grills 123 are waste receiving areas or gutters 109 which are adapted to be suitably cleaned by means of cleaners 110 which may comprise an elongated rod 112' that has a movable scraper 111 suitably connected thereto, FIG. 11.

As shown in FIG. 9, the cows are adapted to be arranged in groups of four and a pair of cows of each group of four are arranged in head to head relation. The numeral 112 indicates the stalls, and the numeral 113 indicates water bowls, and one water bowl 113 is adapted to suffice for a pair of the cows 33, but each cow 33 is adapted to have its own individual feed box 114. The stalls 112 are defined or delineated by framework or frame portions 115, 116 and 117, and end portions of the stalls 112 are open as at 118 whereby the animals or cows can readily enter or leave the stalls at the desired or proper time. In FIG. 11 the numeral 119 indicates a milk receiving container which may be arranged below the platform 105, and the lines or conduits 120 may be provided for permitting the milk to flow therethrough whereby such milk can enter the container 119, and the container 119 can be suitably emptied in a conventional manner when desired or required.

In FIG. 5 the numeral 121 indicates a water inlet line or conduit which may be connected to a suitable source of supply of water, and a valve 122 may be provided in the line 121 for regulating the flow of water therethrough, and the line 121 is adapted to provide water for the water bowls such as the bowls 67.

From the foregoing it will be seen that there has been provided a milk production center, and in use with the parts arranged as shown in the drawings, and in particular shown in FIGS. 1 through 8 of the drawings, it is to be noted that the tanks 36 are adapted to be supplied or filled with feed from a suitable source of supply, and with the parts arranged as shown in FIG. 1, for example, a plurality of cows such as the cows 33 are adapted to be arranged in separate rows or groups, and wherein the cows are arranged in aligned head to head relation. Each cow is maintained or retained in its own separate stall 32, and by loosening the nuts on the U-bolts 78, the frame section 73 can be moved back and forth, that is the frame section 73 can be moved toward or away from either of the side sections 51, and after the frame section 73 has been adjusted to its desired position, the nuts on the bolts 78 can be tightened in order to maintain the frame section 73 immobile in its desired adjusted position. This construction permits the effective size of the stalls to be adjusted or varied whereby cows of different sizes can be conveniently accommodated therein.

With the switch 89 on, and with the motor 42 actuated FIG. 5, it will be seen that the shaft 40 of the auger 3 will be rotated so that the spiral element 41 will mov the feed from the tank 36 through the tube 39 and thi feed will then pass downwardly through the fittings 4 and then drop downwardly by gravity through the cal brated or graduated transparent tubes 46. Due to th provision of the calibrations or graduations 47 on th tubes 46, the farmer or other person can readily keep a accurate record of the amount of feed consumed by particular cow so that this information can be used a an accurate gauge or measurement to ascertain whic cows are best producers or the like.

The feed from the lower ends of the tubes 46 droi into the feed box or mangers 48 and each cow has its ow feed box 48, and as the feed is consumed by the cov additional feed will drop down from the tube 46 to re place the feed which has been consumed so that there always an available supply of feed for the cow.

The gutters 30 and grills or gratings 31 are arranged s that the waste or excrement from the cows will t conveniently received thereon, and these gutters an gratings can be readily cleaned in any suitable manne In addition, air is adapted to be circulated or blow into the barn 21, as for example by means of a suitabl air blower 90, and suitable ducts or pipes 91 are adapte to be used for conveying the air from the blower 90 t the various different locations in the barn, and thi arrangement serves to insure that there will be an adi quate supply of oxygen for the cows so that they ca produce milk in the most advantageous manner. Thei is also provided in the barn lines 93 and 94 which sen as milk and vacuum lines for use in conjunction wit conventional milking machines as desired or require Also, water for the bowls such as the bowls 67 is adapte to be supplied from a suitable location through a pipe series of pipes as indicated by the numeral 121.

The feed box 48 in each stall is adjustable so that, fc example, as shown in FIG. 8 the feed box 48 can t moved from the solid line position to the dotted lir position or vice versa, and this arrangement permi the feed box to be positioned in the most advantageous desirable location. For example, to adjust the feed bc it is only necessary to loosen set screws such as s screws which engage the member 62 so that the shanl 64 can be adjusted as desired. Also, by loosening tl set screws 63, the members 62 can be adjusted up or dow on elements such as the elements 59, and after these par have been moved to the desired location, the set screv can be tightened in order to maintain the parts such the feed box stationary in its adjusted position.

One of the tubes 46 is adapted to have an extensic 79 on the upper end thereof, FIG. 5, and this arrang ment serves to help regulate the flow of feed throug the parts such as the tubes since the movable plunger { will be selectively actuated when the tube 46 with tl extension 79 thereon is thrown up so that the upper er of the stem 81 will lift up the spring arm 83 to separa the contacts 84 and 85 and this will interrupt the circu to the motor 42 so that no further feed will be conveyi from the tank 36 to the remaining tubes, whereby th mechanism provides a means for automatically regula ing the supply of feed to the tubes and feed boxes.

The parts can be made of any suitable material and different shapes or sizes.

With reference to the modification shown in FIGS. 10 and 11, the cows 33 are arranged in a different mann as contrasted to the arrangement shown in FIG. 1 f example. Thus, in FIG. 9 the cows are arranged in groups of four, with two cows arranged in head to head relation with respect to each other, and two other cows also are arranged in head to head relation with respect to each other for each group of four cows. The gratings 123 are adapted to be conveniently positioned to the rear of the cows for use over the waste receiving areas or tanks 109, and the cleaners 110 may be manually moved by gripping the rod 112' so as to provide a means for conveniently cleaning out waste material from the areas 109. Due to the provision of the raised platforms 105, the cleaning out of the areas 109 is facilitated. Also, the elevation of the cows facilitates location of a milk receiving container such as the container 119 shown in FIG. 11. The individual stalls on the platform 105 are defined by frame work such as the frame work 115, 116 and 117, and these stalls are indicated by the numeral 112. Each stall has its own separate feed box 114 which is adapted to be supplied from a graduated transparent tube 108 which functions in the same general manner as the previously described tube 46, and one water bowl 113 may be used for each pair of cows.

With further reference to the motor 42, and switch cocntacts 84 and 85, when the tubes are filled with feed, the stem 81 will move upwardly at the proper time to open the contacts 84 and 85 to stop further operation of the motor 42 so that overloading of the tubes 46 will be prevented, and when the level of feed drops below a predetermined point, the contacts 84 and 85 may be manually closed to start the operation of the motor 42 to convey additional feed from the tank 36 to the tubes 46. Thus, this mechanism operates to provide a means for maintaining the feed box 48 adequately filled with feed which is readily available at all times to the cows. This mechanism is adapted to be arranged or utilized in such a manner that there will be no conflict with 24-hour reading of feed consumption, and if necessary the switch may be time controlled or manually operated.

With further reference to the barn 96 of FIG. 10, the walls such as the walls 99 may be of prefabricated insulated construction with a vapor barrier, and the roof 101 may include trussed rafters. Compacted fill may be arranged just below the floor 103. Rubber stall mats may be used in the stalls such as the stalls 112, and removable grill covers may be used in conjunction with the metal grills 123.

The parts are arranged so that cleaning of the stalls and adjacent areas can be readily accomplished, and for exmple there is the spaces 54 which help insure that there will be a minimum amount of obstructions. Furthermore, the provision of the raised platforms 105 helps insure cleanliness, FIG. 10. Due to the provision of the calibrated tubes 46, a percon can readily determine how much feed a cow consumes so that a scientific analysis can be made to determine which cows are eating too much in proportion to the amount of milk being produced so that for example those cows which are not producing properly can be slaughtered or the like. When all of the feed tubes are filled up, the auger automatically cuts off. In actual practice it is only necessary to turn on the switch such as the switch 89 at a predetermined period of time such as in the morning whereby all of the feed tubes 46 will be filled up.

The calibrated tubes function as measuring devices and permit an accurate determination to be made of feed delivered to each trough 48 and consumed by each cow. Such information can be used for various purposes, for example, as an aid in determining when a cow is sick or when a cow is not eating properly or producing according to the usual desired standards. For example, if a tube 46 holds 100 pounds of feed, and 24 hours after filling, it has 50 pounds of feed remaining in the tube, the attendant will know that 50 pounds has been delivered to the feed box or trough 48 and eaten by the animal.

An important aspect or feature of the present invention is the provision of a blended feed, and wherein the cows are self fed so as to obtain the desired results, and this permits increased production of milk and helps insure that the cows will remain in excellent condition. The blended feed may consist of very coarse ground hay, beet pulp, grain, and minerals in one mixture. As a specific example, the feed may contain 6 to 18% crude protein, 40 to 80% total digestible nutrients, 8 to 25% fiber content, and have a digestible nutritive ratio between 1:5.0 and 1:8.0. The digestible nutritive ratio is the ratio of digestible fats to total digestible nutrients in the feed.

FIG. 9 illustrates the cows permanently housed in stalls in head to head alignment, and the cows may be placed in or removed from these permanent stalls 112 by means of portable ramps. Twenty-four hour self feeding is provided, and the raised platforms permit permanent stall milking and self feeding systems to be readily brought about.

Also the present invention is a means whereby milk may be produced in strategic locations in populated areas providing a superior nutritional program, and a highly sanitary arrangement by means of an integrated construction or arrangement, and there is an automated housing or facilities with free unlimited self feeding of the livestock together with a closed manure handling system.

Also there is a means for measuring the feed intake of the animals together with a means whereby dairy cows may be milked in an elevated position in a stall barn for easier and more labor saving efficiency.

With the present invention a milk producer may bargain and/or sell his own farm milk at a better market price as for example to a retail cash and carry customer, or in bulk to a wholesale dealer.

The present invention helps insure that there will be a minimum amount of feeding and bedding odors and the physical facilities are such that there will be improved herd health, care, environment and management.

By using the constant self feeding, the animals will have better health, and the milk that is produced will have a more constant solids basis, and drop off in production will be eliminated. Furthermore there will be less nutrients consumed per cow, as there will be no energy wasted by the cow in foraging. No bedding is required and by the stall arrangement, the job of chasing cows is eliminated, and the cows will have increased contentment. The integrated and automated operation assures greater economy, and greater production per man hour, and wherein there will be increased milk production and a fresher product can be gotten to the consumer, and the graduated feed measuring device tells the cow's daily feed consumption. The cows have a 24-hour uninterrupted eating time which gives better poduction due to the self feeding arrangement. Also there is a ventilation means and the full feeding system provides top production. Due to the provision of the adjustable frame section or partition 73, the cows can be positioned in the most advantageous position for most efficient milking.

Due to the provision of the elevated cow stalls, workmen can remain in a generally upright position during the milking operation. Also, the cows are arranged in the tandem aligned relation for head to head and tail to tail position for minimizing health hazards. The stalls are arranged to insure maximum comfort of cows, and the feed system reduces dust, storage space requirements, waste of vitamins, additives and the like and minimizes or facilitates the handling of the feed and wherein there is improved product control.

In some instances the stalls and equipment may be inserted in trailers or incorporated in mobile building sections or the like, and incorporated or interlocked into a building or dairy establishment, and the mobile building sections may be integrated into a permanent housing structure.

With further regard to the feed, the feed includes such nutrients that each individual cow has free access to feed which supplies her daily needed nutrition. The nutrient range may be as set forth in the following example.

| | | |
|---|---|---|
| Proteins | percent | 6 to 18 |
| Fat | do | 1 to 5 |
| T.D.N. | do | 40 to 80 |
| Nutritive ratio | | 1:5.0 to 1:8.0 |

The equipment may be installed in new buildings or may be installed in existing buildings.

Also, the waste products will have uniform qualities through the uniform nutritive program, with much lower biological oxygen demand requirements.

Each feed tube may be of a suitable size such as 12 inches in diameter and 2 feet long and such feed tube is adapted to hold approximately 100 pounds of feed so that one cow will have more than sufficient feed for a 24-hour period.

The present invention is particularly directed to the concept of self feeding of dairy cows.

The following is given as a further example of the feed composition.

| | | |
|---|---|---|
| Crude protein | percent | 10 to 12 |
| Fat | do | 2 to 3 |
| T.D.N. | do | 45 to 65 |
| Fiber | do | 12 to 15 |
| Nutrient ratio | | 1:6.0 |

The following is given as a further example to illustrate the critical areas and limitations of the feed.

| | Percent |
|---|---|
| Crude protein | 6 to 18 |
| Fat | 1 to 4 |
| T.D.N. | 40 to 80 |
| Fiber | 8 to 25 |

In addition, additives may be used in the feed.

Various types of conventional accessories can be used in the barns as desired or required.

A ration is the feed allowed a given animal during a day of 24 hours, whether all is fed at one time or in portions at different times. A balanced ration is the feed or combination of feeds furnishing several nutrients, crude protein, carbohydrates and fat in such proportion and amount as will properly nourish a given animal for 24 hours. The present invention is directed to self feeding of dairy cows for the desired satisfactory results. In the prior art, attempts were made to automate dairy cow feeding with silage, hay and grain in predetermined amounts and moving to each animal with a vast amount of complicated machinery, but with the present invention automatic feeding is accomplished with one feed moved in simple equipment and self feeding is insured or provided for. Thus, the present invention is primarily a feeding system and is also a milk production system, and wherein with reference to the feeding system there is provided one feed, a means for moving the feed to the cow, a means of self feeding the cow, a means of measuring the cow's past 24-hour consumption of the feed, and wherein there is provided self feeding stalls with longitudinal and lateral adjustments, and wherein floor connections are eliminated for the previously described purposes. That is, the space such as the space 54 is available or provided to facilitate cleaning in the various areas under consideration.

A cleaner such as the cleaner 110 may be used for taking the wastes outside of the barn, or else the cleaner may be eliminated and a pit can be used as a tank which can be periodically pumped out.

FIG. 9 illustrates stalls in a continuous head to head arrangement positioned with the cows in elevated milking position.

The present invention is thus a novel system of producing a nutritious feed which is easily handled and which can be self fed, and the present invention also contemplates the processing and blending of organic feed nutrients within critical areas into one specific feed for simplified automatic self feeding of livestock. There is also provided a means for measuring the individual cow's feed in a consumption in a self feeding system, and every bite of the feed is the same, and there will be controlled uniform milk quality with respect to nutrition, sanitation, flavor and milk solids content. The feed is highly palatable so that the animal will eat it by self feeding in adequate amounts but without over indulgence. Also the animal's biological needs will be satisfied to the optimum extent and the lactation production processes will be maximized. The basic materials are proteins, fats, carbohydrates, fiber, minerals, vitamins and other additives depending upon the specific purposes desired or required. The present invention is thus a process of making the feed and utilizing the same as well as the self feeding means of offering the feed to the animals, and the quantity to be eaten is based on the needs of the animal and is governed by the volume consistency of the feed. The animal will adjust its intake of feed to its needs when given this feed under self feeding conditions. The feed is free flowing and provides essential nutrients.

With reference to the gutter grill or grate, this provides a positive means for preventing the animals from standing with the hind feet in the gutter trough. Also, this provides a greater depth of better trough and helps eliminate gutter splash, and the grates may be removable. Also improved sanitation in the stalls is provided for since the stalls can be more readily kept clean and dry, and no bedding is required, and animal positioning head barriers can be used for keeping the animals in position while standing back over the grating.

The present invention may be suitably arranged or located so that customers can drive up thereto and make their purchases in a highly convenient and satisfactory manner, and the present invention provides an integrated wholesale or retail establishment for producing and handling milk. In other words the present invention is a combination of an integrated merchandising and producing center. In the integrated milk marketing arrangement of the present invention, air or oxygen, water and feed are introduced, and milk and waste are withdrawn or removed as previously stated.

The following is given as a further example as, for example, in making up 2,000 pounds of feed:

| | Pounds |
|---|---|
| Corn meal | 1,050 |
| Wheat middlings | 200 |
| Soy bean meal | 200 |
| Hay (chopped on a ¾" milled screen) | 500 |
| Salt and minerals (additives) | 50 |
| Total | 2,000 |

Minor changes in shape, size and rearrangement of details coming within the field of invention claimed may be resorted to in actual practice, if desired.

What is claimed is:

1. A method of dairy cow self-feeding to obtain optimum cow performance, comprising the steps of restraining the cow in an enclosed habitat area, providing the cow with an unlimited quantity of only one uniformly blended complete feed, which has a nutrient range of from about 6 to 18% crude protein, 1 to 5% fat, 40 to 80% T.D.N., and a nutritive ratio between 1:3.0 to 1:9.0, providing the feed in a feed dispenser, and permitting the cow random, unlimited access to the feed in the dispenser.

2. The method as defined in claim 1 and further including the step of measuring the consumption of feed at fixed regular intervals.

(References on following page)

References Cited by the Examiner
UNITED STATES PATENTS

| | | | |
|---|---|---|---|
| 594,785 | 11/97 | Fouzer | 119—53 |
| 2,039,562 | 5/36 | Shodron | 119—16 |
| 2,081,725 | 5/37 | Ainsa | 222—457 |
| 2,081,947 | 6/37 | McCornack | 119—14.03 |
| 2,162,609 | 6/39 | Dawe | 99—2 |
| 2,305,259 | 12/42 | Jeffers | 119—14.04 |
| 2,358,000 | 9/44 | Cornell | 119—16 |
| 2,472,122 | 6/49 | Polivka | 119—16 |
| 2,654,344 | 10/53 | Peterson et al. | 119—16 |
| 2,758,566 | 8/56 | Talbott | 119—51 |
| 2,779,309 | 1/57 | Myer et al. | 119—51 |
| 2,853,052 | 9/58 | Pearson | 119—27 |
| 2,904,002 | 9/59 | Ferris | 119—27 |
| 2,910,361 | 10/59 | Kunz | 99—6 |
| 2,929,356 | 3/60 | Bicigalupo | 119—51 |
| 2,940,856 | 6/60 | Geisendorf | 99—2 |
| 2,942,574 | 6/60 | Golay | 119—52 X |
| 2,969,039 | 1/61 | Golay | 119—14.03 |
| 3,029,184 | 4/62 | Visek | 167—53 |
| 3,043,266 | 7/62 | Olscheske | 119—27 |

OTHER REFERENCES

Publication of The American Society of Animal Production 31, dated 1938, pages 40–47, article by E. B. Powell.

Publication: Checkerboard Service, published by Ralston Purina Chow Co., July-August 1963, pages 10 and 11.

SAMUEL KOREN, *Primary Examiner.*

ALDRICH F. MEDBERY, *Examiner.*